J. C. BOYD.

Assignor to himself, C. P. WILSON and L. L. BOBLETT.

Cultivator.

No. 8,406. Reissued Sept. 10, 1878.

WITNESSES.

James B. Lyons

R. P. Daggett.

INVENTOR.

Jesse C. Boyd,

PER

C. Bradford.

ATTORNEY.

N. PETERS, PHOTO-LITHOGRAPHER, WASHINGTON, D. C.

UNITED STATES PATENT OFFICE.

JESSE C. BOYD, OF MILROY, INDIANA, ASSIGNOR TO HIMSELF, CHARLES P. WILSON, AND L. L. BOBLETT.

IMPROVEMENT IN CULTIVATORS.

Specification forming part of Letters Patent No. 73,291, dated January 14, 1868; Reissue No. 8,406, dated September 10, 1878; application filed April 10, 1878.

*To all whom it may concern:*

Be it known that I, JESSE C. BOYD, of the town of Milroy, in the county of Rush and State of Indiana, have invented certain new and useful Improvements in Cultivators, of which the following is a specification:

Reference is made to the accompanying drawings, which are made a part hereof, and on which similar letters of reference indicate similar parts.

Figure 1:
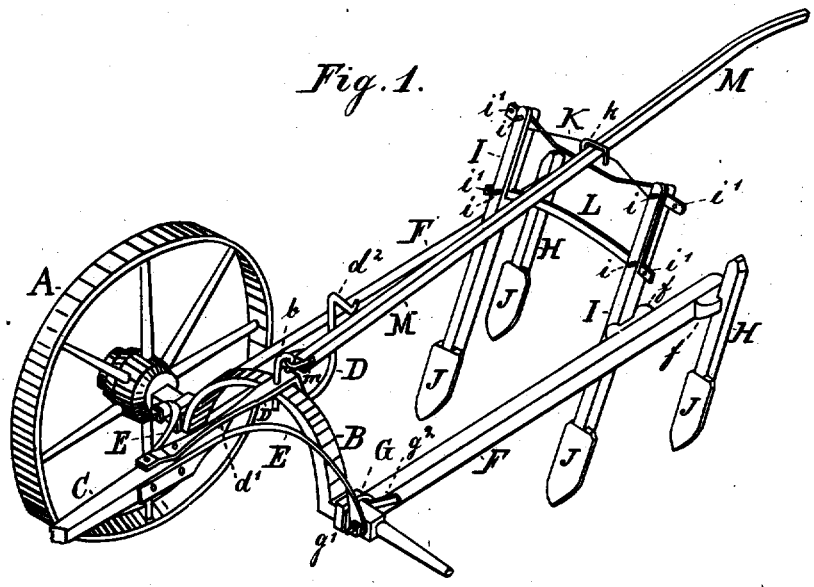
Figure 2:
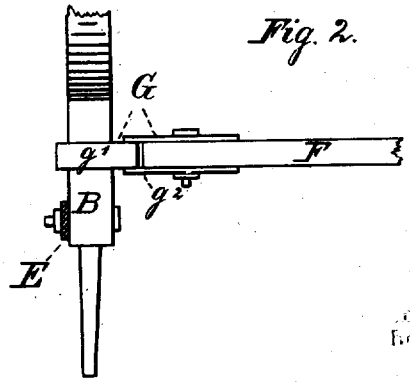

Figure 1 is a perspective view of a machine embodying my invention, one of the wheels being left off, so that an uninterrupted view of the other parts may be obtained. Fig. 2 is a detail plan view of the double clevis and a portion of the axle and plow-beam.

In these drawings the various portions are marked with letters of reference, as follows:

A is one of the supporting and carrying wheels. B is the axle-tree, which I arch in the center, so that it may pass over the young plants without breaking them down. C is the tongue or pole by which the machine is drawn. It is attached to the axle by the bar D and the braces E E. The bar D serves two purposes. Its front end forms a draft attachment, by which the pole is secured to the axle, and its rear end is curved upwardly and forms a rest for the handle M, and upon which said handle is placed when it is desired to keep the plow-points from the ground. The braces E E serve to hold the tongue firmly in position. F F are the plow-beams, which are secured to the axle by the clevis attachments G G. Each of these attachments consists of two parts. One of these—the clevis or band $g^1$—is upon the axle, and will move along it, and thus laterally adjust the front end of the machine. The other—the clevis $g^2$—is upon the end of the plow-beam, and will move up and down, thus adjusting the machine to the inequalities of the earth, or allow the operator to cause the plows to enter more or less deeply into the ground. These two clevises interlock, and thus form the attachment.

Upon either side of the rear ends of the plow-beams F are attached the plow-standards H I, upon the lower ends of which are the plows J J. These standards are secured at the requisite distance sidewise from each other by the enlargements or projections *f f* upon the beams F. Two of the standards I I extend above the plow-beams, and are connected together by the bars K L, which enter mortises or slots in said standards, and are attached thereto by pins *i i*. These bars are provided with a number of holes, $i^5$ $i'$, by means of which the rear end of the machine is adjusted laterally, which is done by removing the pins, readjusting the bars, and inserting the pins in the new position.

M is the handle, the forward end of which is attached to the axle or to the bar D, and which is also attached, at a suitable point, to one of the cross-bars between the standards I I. With this handle the operator may raise the plows from the earth, and by placing it upon the rest $d^2$ may keep them therefrom while driving to and from the field. He may also, by its use, while the machine is in operation, shift the plows from one side to the other, incline them, with their standards, in either direction, and lift them over obstructions.

*b* is a suitably-constructed pin running through the bar D and the axle B, and having a curved upper end, into which the loop or clevis *m* on the front end of the handle M is hooked. *k* is a loop or staple on the bar K, through which the handle M passes.

Having thus fully described my said invention, what I claim as new, and desire to secure by Letters Patent, is—

1. In a cultivator, the combination of the handle M, the cross-bar K, and the rest $d^2$ with the plows, beams, and standards, for the purpose of holding them up from their ordinary positions, substantially as herein shown and specified.

2. In a cultivator, the combination of the pole C, axle B, plow-beams F F, adjustable attachments G G, standards I I, cross-bars K L, and handle M, substantially as herein shown and described, and for the purposes specified.

In witness whereof I have hereunto set my hand and seal at Rushville, Indiana, this 27th day of February, A. D. 1878.

JESSE C. BOYD. [L. S.]

In presence of—
BEN. L. SMITH,
GEO. W. YOUNG.